(12) United States Patent
Zenere

(10) Patent No.: US 9,878,496 B2
(45) Date of Patent: Jan. 30, 2018

(54) SYSTEM AND METHOD FOR MIXING A STEREOLITHOGRAPHY RESIN

(71) Applicant: DWS S.R.L., Zanè (IT)

(72) Inventor: Sergio Zenere, Carrè (IT)

(73) Assignee: DWS S.R.L., Thiene (IT)

( * ) Notice: Subject to any disclaimer, the term of this patent is extended or adjusted under 35 U.S.C. 154(b) by 330 days.

(21) Appl. No.: 14/417,042

(22) PCT Filed: Jul. 25, 2013

(86) PCT No.: PCT/IB2013/001626
§ 371 (c)(1),
(2) Date: Jan. 23, 2015

(87) PCT Pub. No.: WO2014/020401
PCT Pub. Date: Feb. 6, 2014

(65) Prior Publication Data
US 2015/0210012 A1    Jul. 30, 2015

(30) Foreign Application Priority Data

Jul. 30, 2012   (IT) ................................ VI2012A0188

(51) Int. Cl.
*B29C 67/00*  (2017.01)
*B01F 13/08*  (2006.01)
(Continued)

(52) U.S. Cl.
CPC .......... *B29C 67/0088* (2013.01); *B01F 13/08* (2013.01); *B01F 13/0818* (2013.01); *B01F 15/00266* (2013.01); *B01F 15/00279* (2013.01); *B01F 15/00318* (2013.01); *B01F 15/00363* (2013.01); *B01F 15/00389* (2013.01); *B01F 15/00396* (2013.01); *B01F 15/00409* (2013.01); *B01F 15/00831* (2013.01);
(Continued)

(58) Field of Classification Search
CPC ......... B33Y 40/00; B33Y 50/02; B01F 13/08; B01F 15/00318; B01F 15/00389; B01F 15/00409; B01F 2215/0049; B01F 2215/0059
USPC .................................................. 366/273, 274
See application file for complete search history.

(56) References Cited

U.S. PATENT DOCUMENTS

| | | | | |
|---|---|---|---|---|
| 4,576,888 A * | 3/1986 | Miyakawa | ............ | C09B 69/008 106/490 |
| 4,653,519 A | 3/1987 | Kanner | | |
| 5,116,712 A * | 5/1992 | Nakamura | ................ | G03G 9/09 106/413 |
| 5,918,093 A * | 6/1999 | Kim | ...................... | G03G 15/104 366/273 |
| 7,751,934 B2 * | 7/2010 | Konietzko | .......... | B01F 13/1055 366/17 |
| 2004/0018441 A1 * | 1/2004 | Maric | ................... | G03G 9/0804 430/137.14 |
| 2008/0151686 A1 | 6/2008 | Meadows et al. | | |
| 2008/0298820 A1 * | 12/2008 | Sugiura | .............. | G03G 15/0855 399/12 |

(Continued)

FOREIGN PATENT DOCUMENTS

| | | |
|---|---|---|
| DE | 10 2010 026 912 A1 | 1/2012 |
| EP | 1 375 115 A1 | 1/2004 |

(Continued)

OTHER PUBLICATIONS

Nov. 19, 2013 Transmittal of International Search Report and Written Opinion of the International Searching Authority for PCT/IB2013/001626.

*Primary Examiner* — Tony G Soohoo
(74) *Attorney, Agent, or Firm* — Husch Blackwell LLP

(57) ABSTRACT

The invention is a package (1) for stereolithography comprising a container (2) filled with stereolithography resin (3), provided with an access opening (4), and a mixer element (5) arranged in a removable manner in the container (2) and provided with at least one magnet (6).

9 Claims, 2 Drawing Sheets

(51) Int. Cl.
  B01F 15/00 (2006.01)
  B01F 15/06 (2006.01)
  B29C 64/135 (2017.01)
  B29C 64/386 (2017.01)
  B33Y 30/00 (2015.01)
  B33Y 40/00 (2015.01)
  B33Y 50/02 (2015.01)

(52) U.S. Cl.
  CPC ............ B01F 15/06 (2013.01); B01F 15/065 (2013.01); B29C 64/135 (2017.08); B29C 64/386 (2017.08); *B01F 2015/062* (2013.01); *B01F 2215/0049* (2013.01); *B01F 2215/0059* (2013.01); *B33Y 30/00* (2014.12); *B33Y 40/00* (2014.12); *B33Y 50/02* (2014.12)

(56) References Cited

U.S. PATENT DOCUMENTS

2010/0007501 A1   1/2010   Yang et al.
2011/0177452 A1*  7/2011   Hosoya ................ G03G 9/0804
                                              430/137.14
2011/0244386 A1* 10/2011   Kamikura ............ G03G 9/0804
                                              430/108.4

FOREIGN PATENT DOCUMENTS

EP      2 286 907 A1    2/2011
JP      2007136443 A    6/2007
WO   WO 2007/053870 A2  5/2007

\* cited by examiner

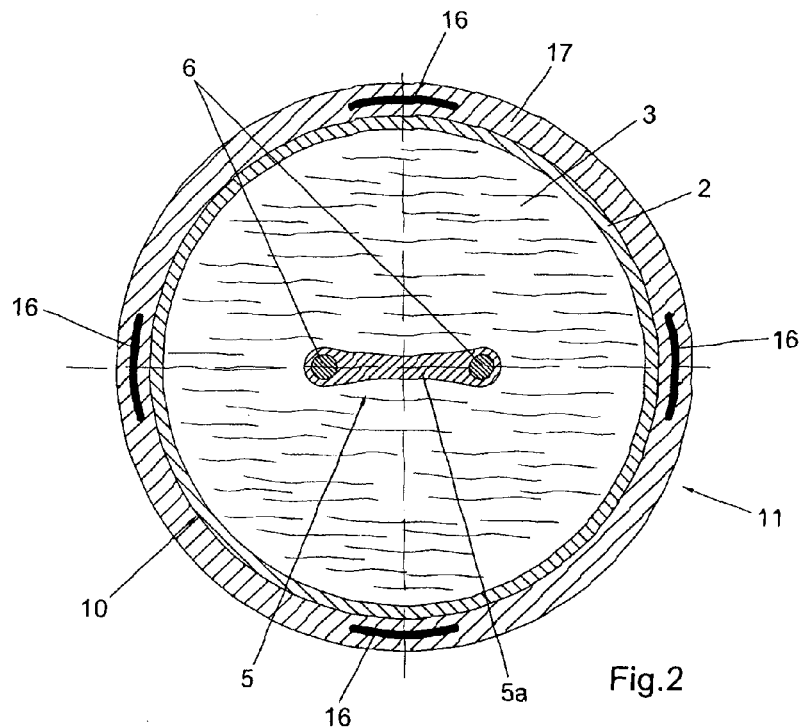
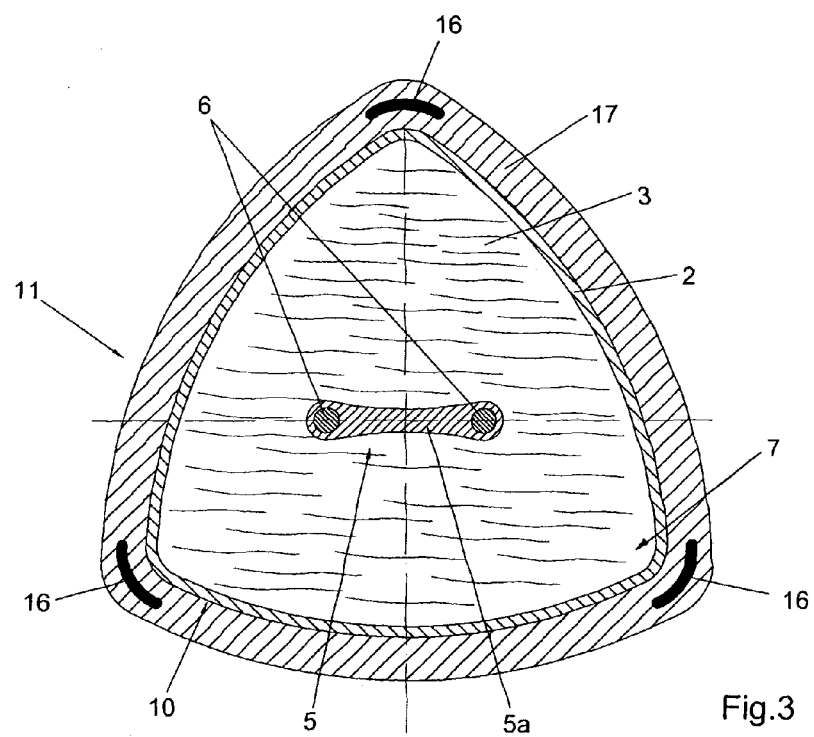

SYSTEM AND METHOD FOR MIXING A STEREOLITHOGRAPHY RESIN

The present application is a US National Stage application of international application no. PCT/IB2013/001626, filed 25 Jul. 2013 and published in the English language with publication no. WO 2014/020401 A1 on 6 Feb. 2014, which claims the benefit of the filing date of IT VI2012A000188, filed 30 Jul. 2012.

The present invention concerns a package of stereolithography resin, suited to be used to feed a stereolithography machine.

The present invention also concerns a mixing device suited to be used with said package.

The present invention also concerns a method for mixing the stereolithography resin contained in said package.

As is known, a stereolithography machine is a device that allows a three-dimensional object to be produced by superimposing a plurality of layers on top of one another, said layers being obtained through the solidification of a suitable stereolithography resin.

In particular, the term "stereolithography resin" means a liquid or pasty material suited to solidify when exposed to a predefined radiation, in particular a luminous radiation.

The stereolithography resin is available on the market packaged in containers that are provided with a closing cap.

When necessary, the container is opened and the resin contained therein is poured into a tank of the stereolithography machine in order to solidify it.

Many stereolithography resins are mixtures made up of several components having different specific weights and including, for example, epoxy resins, ceramic particles in suspension and the like.

In said mixtures, also called "hybrid resins", the heavier components tend to sediment during the periods of inactivity, for example during the time elapsing from when the resin is packaged in the container to when it is actually used in the machine.

Therefore, before using a resin of the type mentioned above it is necessary to mix it, in such a way as to restore its homogeneity.

According to the known art, the resin contained in the container is mixed manually, for example using a stick.

Obviously, this manual operation poses the drawback that it is uncomfortable and that the operator needs a certain amount of time to carry it out.

A further drawback posed by the manual mixing operation lies in that it is very subjective and, therefore, it does not allow repeatable results to be obtained.

In particular, manual mixing cannot be optimised for each specific type of resin contained in the container.

Furthermore, the manual mixing operation involves as a further drawback the risk that the operator may accidentally come into contact with the resin, which often has a certain degree of toxicity.

The manual mixing operation poses also the drawback that it requires that the container be opened, with the consequence that the resin is exposed to the atmospheric agents, in particular to the air of the external environment, which may cause it to deteriorate.

The present invention intends to overcome all the drawbacks of the known art outlined above.

In particular, it is a first object of the present invention to provide a package of stereolithography resin that makes it easier to mix the resin contained therein.

It is also the object of the invention to allow a mixing operation that is repeatable and independent of the operator to be carried out.

It is a further object of the invention to avoid the exposure of the resin to the atmospheric agents during the mixing operation.

The above mentioned objects are achieved by a package of stereolithography resin as described below, as well as by a mixing device suited to be used in combination with said package as described below.

The above mentioned objects are also achieved by a method for mixing a stereolithography resin as described below.

Further characteristics and details of the invention are also described.

Advantageously, the fact that the resin is easier to mix lightens the operator's tasks.

Still to advantage, the repeatability of the mixing operation ensures that the resin is mixed effectively before being used.

Furthermore, advantageously, the invention makes it possible to prevent the operator from coming into contact with the stereolithography resin, thus reducing the risks related to the toxicity of the latter.

Still advantageously, the possibility to protect the resin from the atmospheric agents during the mixing operation makes it possible to preserve the resin itself, increasing its duration.

Still advantageously, the invention makes it possible to carry out the mixing operation taking into account the type and quantity of the resin contained in the container, in such a way as to obtain optimal mixing results in the different possible situations.

The said objects and advantages, together with others which will be highlighted below, are illustrated in the description of a preferred embodiment of the invention which is provided by way of non-limiting example with reference to the attached drawings, wherein:

FIG. 2 shows a cross section of FIG. 1 carried out along plane II-II;

FIG. 3 shows a cross section of a variant embodiment of the package of FIG. 1 carried out along a plane analogous to that of FIG. 2.

Figure 1:
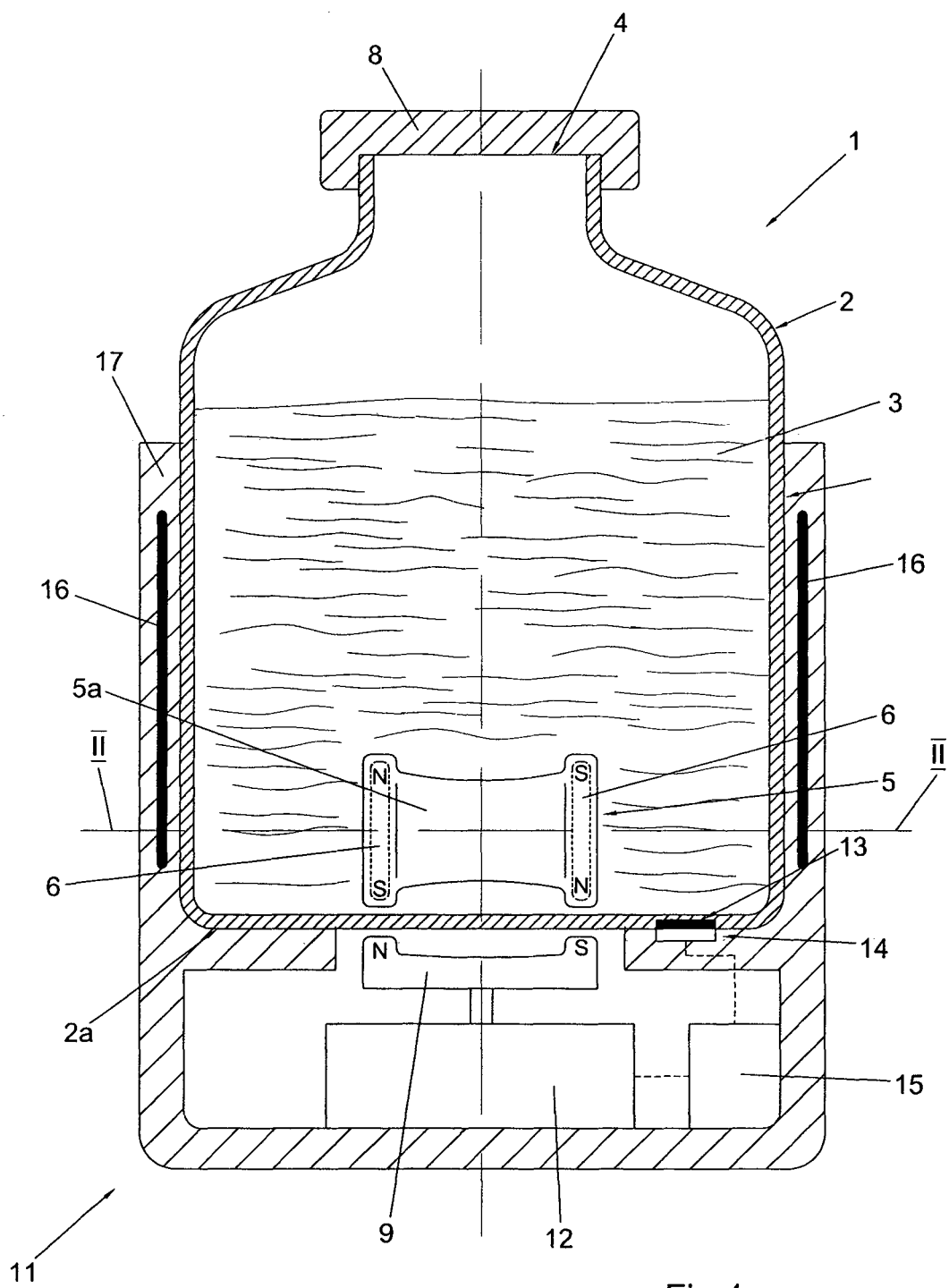
FIG. 1 shows a side sectional view of a package of stereolithography resin according to the invention positioned on a mixing device.

The invention is described with reference to a stereolithography system comprising a stereolithography machine, not illustrated herein but known per se, of the type suited to produce a three-dimensional object.

In particular, the stereolithography machine produces the three-dimensional object through the selective solidification of a stereolithography resin in successive superimposed layers.

The stereolithography resin is supplied in a package, indicated as a whole by 1 in FIG. 1, which comprises a container 2 filled with said stereolithography resin 3.

Preferably, the stereolithography resin 3 is a resin of the so-called "hybrid" type, meaning a mixture of several components having different specific weights including, for example, epoxy resins, ceramic particles in suspension and the like.

Said container 2 is provided with an access opening 4 from which it is possible to withdraw the stereolithography resin 3.

Furthermore, the package 1 comprises a mixer element 5 arranged in a removable manner in said container 2.

The mixer element 5 is also provided with one or more magnets 6, represented with a broken line in FIG. 1.

Advantageously, said magnets 6 react to a magnetic force produced by a magnet 9 arranged outside the container 2.

In particular, the external magnet 9 induces the magnets 6 of the mixer element 5 to be oriented with the respective north pole N and south pole S in opposition with respect to the corresponding poles N, S of the external magnet 9.

Therefore, the movement of the external magnet 9 causes an analogous movement of the mixer element 5.

Obviously, the movement of the mixer element 5 mixes the stereolithography resin 3 contained in the container 2.

It can be understood that the possibility to move the mixer element 5 from the outside of the container 2 makes it possible to mix the stereolithography resin 3 with no need to open the container 2, thus achieving the object to preserve the resin contained in the container from the atmospheric agents.

Furthermore, advantageously, said package 1 is particularly simple to make, as it does not require any connection device to connect the mixer element 5 to the container 2.

In fact, the position and the movement of the mixer element 5 are determined by the position and the movement of the external magnet 9.

Therefore, the package 1 can be obtained by simply inserting the mixer element 5 in the container 2 together with the stereolithography resin 3.

Preferably but not necessarily, the movement of the external magnet 9 is a rotation around the geometrical axis of the container 2.

Advantageously, and as will be explained below, said rotation can be obtained by connecting the external magnet 9 to particularly simple motorisation means 12 like, for example, an electric motor.

Obviously, according to variant embodiments of the invention the mixer element 5 may perform a movement different from rotation, for example a translation movement, a planetary movement or any other movement of the known type.

Preferably, the mixer element 5 comprises two magnets 6, arranged in such a way that each pole N, S of a magnet 6 faces a corresponding pole N, S of the other magnet 6.

In particular, as shown in FIG. 1, each one of the poles N, S of a magnet 6 faces the pole with opposite sign of the other magnet 6.

In this way, each one of the two poles N, S of the external magnet 9 attracts the pole with opposite sign of a corresponding magnet 6 of the mixer element 5 and repels the other pole of the same magnet 6.

Therefore, the two magnets 6 of the mixer element 5 are forced to assume a position that is coplanar with the external magnet 9.

In particular, when the external magnet 9 is rotated according to a plane parallel to the bottom 2a of the container 2, the mixer element 5 rotates while at the same time remaining perpendicular to the bottom 2a, with the advantage of increasing the efficiency of the mixer element.

Still advantageously, with the two magnets 6 arranged opposing each other as described above, the mixer element 5 has such a configuration that it can assume any one of two equivalent positions, one rotated by 180° with respect to the other.

Still advantageously, the opposing arrangement of the two magnets 6 makes it possible to use a single external magnet 9 to move them.

According to a variant embodiment of the invention, not illustrated herein, the two magnets 6 of the mixer element 5 may be arranged with the respective poles N, S with the same sign mutually facing each other.

In this case, the movement of the mixer element 5 is obtained by means of two external magnets, arranged, too, with the respective poles N, S with the same sign facing each other, in such a way as to attract the corresponding poles with opposite sign of the magnets 6 of the mixer element.

It can be understood that, also in this variant embodiment, the mixer element 5 assumes an operating configuration that is coplanar with respect to the external magnets.

In any case, the mixer element 5 preferably comprises a laminar body 5a that extends between the two magnets 6.

Advantageously, the laminar body 5a carries out the mixing action following the rotation of the mixer element 5.

Obviously, variant embodiments of the invention may comprise a mixer element with a single magnet, or with more than two magnets.

In these variant embodiments, the laminar body 5a is configured, with respect to the magnets, in such a way that in the operating position it develops mainly on the plane that is perpendicular to the rotation axis of the mixer element 5.

With regard to the container 2, it is preferably a bottle, which can advantageously be supplied separately from the stereolithography machine.

Preferably, said bottle has a flat bottom 2a that, advantageously, improves the mixing action, as it eliminates the presence of concave portions at the level of the corners of the container 2, which can hardly be reached by the mixing action.

Still advantageously, the flat bottom 2a favours the proximity of the mixer element 5 to the external magnet 9.

It can be understood that said proximity increases the attraction between the magnets 6 of the mixer element 5 and the external magnet 9, thus facilitating the driven movement of the mixer element 5.

The bottle has a preferably circular cross section, as shown in FIG. 2.

According to a variant embodiment of the invention, shown in FIG. 3, the cross section of the bottle is delimited by a mixtilinear profile.

Said mixtilinear profile makes it possible to precisely fit the bottle in a seat 10 whose shape matches the shape of the container.

Said configuration of the seat 10 advantageously prevents any rotation of the bottle around its axis following the rotational movement transmitted to the mixer element 5.

Preferably, the cross section is generally triangular in shape, which advantageously facilitates the storage of the bottle.

Obviously, in variant embodiments of the invention the shape of the bottle can be other than triangular, more generally polygonal.

Preferably, the bottle is supplied with the access opening 4 sealed by a cap 8.

Said cap 8 advantageously makes it possible to preserve the contents of the container 2, avoiding any deterioration due to its contact with external agents.

Obviously, variant embodiments of the invention may comprise a container 2 configured so that it can be used directly as a tank for the stereolithography machine, for example with a transparent bottom.

Preferably, the internal surface of the container 2 defines a concave area 7, as in the embodiment shown in FIG. 3, that extends according to a direction orthogonal to the plane of the access opening 4 to the bottom 2a of the container 2.

Said concave area 7 is suited to house a dispensing pipe arranged in the container 2, through which the resin 3 is withdrawn in order to convey it to the stereolithography machine.

Advantageously, said concave area 7 can accommodate the dispensing pipe, thus preventing the latter from interfering with the rotation of the mixer element 5.

Obviously, if the container 2 has a polygonal shape as described above, each one of the vertices of the polygon defines a corresponding concave area 7.

According to a variant embodiment of the invention, not illustrated herein, the mixer element 5 is provided with a through hole in which said dispensing pipe is revolvingly inserted.

Advantageously, said arrangement of the dispensing pipe makes it possible to place its end at the level of the centre of the container 2, from where the resin 3 can be withdrawn more efficiently.

In this case, the dispensing pipe is preferably made of a flexible material, in order to ensure that the mixer element 5 has a certain freedom of movement.

According to the invention, the container 2 comprises also a data support 13 containing information on the type and quantity of stereolithography resin 3 contained in the container 2.

The data support 13 is associated with connection means suited to transmit information on the stereolithography resin 3 to an external device, for example to the stereolithography machine or to an automatic mixing device 11 of the type shown in FIG. 1.

Advantageously, the presence of said data support 13 allows the external device to carry out the processing based on the contents of the container 2.

Preferably but not necessarily, the data support 13 is an electronic device, for example a transponder of the RFID type (radio-frequency identification), an integrated circuit (microchip) or a similar device.

According to variant embodiments of the invention, the data support 13 can be a magnetic band or any other support, provided that it is suited to store said information.

Regarding the connection means, they preferably comprise electromagnetic means, such as an antenna or a magnetic field, particularly suited to be used in the case where the data support 13 is respectively a RFID or a magnetic band.

In variant embodiments of the invention, the transmission means may comprise electric means like, for example, a connector, which is particularly suited to be used with an integrated circuit.

In further variant embodiments of the invention, the transmission means may comprise any means, provided that they are suited to transmit the information from the data support 13 to the user device.

As already mentioned, the mixing operation can be performed by an automatic mixing device 11 comprising a seat 10 suited to accommodate the container 2 and comprising also the external magnet 9 and the corresponding motorisation means 12 that sets it rotating.

In particular, the mixing device 11 is configured so that, when the container 2 is associated with the seat 10, the external magnet 9 is in proximity to the container 2 itself and preferably faces its bottom 2a.

Obviously, in variant embodiments of the invention, the external magnet 9 can be arranged in a different position and can be moved in another way, different from that described above.

Preferably, the mixing device 11 comprises reading means 14, for example an antenna, a magnetic reader, a connector suited to be associated with the container 2, or any other means, provided that it is suited to acquire the information contained in the data support 13.

Preferably, said acquisition takes place when the container 2 is associated with the seat 10 and the reading means 14 are configured accordingly.

The mixer device 11 is configured so that it can mix the stereolithography resin 3 based on said information, for example through a logic control unit 15 that controls the motorisation means 12 of the external magnet 9, in particular the rotation speed and the mixing time.

Preferably, the mixing device 11 comprises also heating elements 16 configured so as to establish a thermal contact with the container 2 when the latter is arranged in the seat 10.

Preferably, said heating elements 16 are positioned within the walls 17 that delimit the seat 10.

Advantageously, the heating elements 16 are capable of heating the stereolithography resin 3 contained in the container 2 to a predetermined temperature, in such a way as to favour the mixing of the resin 3 and/or its successive use in a stereolithography process.

Preferably, also the heating elements 16 are controlled by the logic control unit 15 based on the information contained in the data support 13, so as to maintain the resin 3 at the optimal temperature during the mixing operation.

According to a variant embodiment of the invention, the mixing device 11 belongs to the stereolithography machine, with the advantage of simplifying the processing cycle.

The above clearly shows that the invention achieves all the set objects.

In particular, the presence of a magnetic mixer element situated inside the container makes it possible to carry out the mixing operation with no need to open the container itself and thus with no need to expose the resin to the atmospheric agents.

Furthermore, the magnetic operation can be obtained through an automatic mixing device, avoiding the intervention of the operator and thus making the mixing operation simpler and repeatable.

In particular, said mixing device can be configured so that the mixing operation is performed according to the type and quantity of the material contained in the container, thus allowing a more reliable mixing process to be implemented.

The invention claimed is:

1. A method for mixing a stereolithography resin, the method comprising:
   preparing a stereolithography resin package by filling a container, provided with an access opening, with curable stereolithography resin, wherein the stereolithography resin package further comprises:
   a mixer element arranged in a removable manner in the container and provided with at least one magnet and wherein the container further comprises a data support device containing information on a type and quantity of the stereolithography resin, and being associated with a connection means to transmit the information to an external device;
   arranging an external magnet outside of the container and facing a bottom of the container;
   acquiring the information from the data support device through the connection means; and
   controlling a motor, through a logic control circuit, to set the external magnet moving based on the acquired information so as to drive the mixer element.

2. The method according to claim 1, wherein the controlling step comprises controlling a speed of the external magnet moving based on the information illation.

3. The method according to claim 1, wherein movement in which the external magnet is set to move is a rotation.

4. The method according to claim 3, wherein the controlling step comprises controlling a rotation time of the external magnet based on the information.

5. The method according to claim 1, further comprising heating the stereolithography resin.

6. The method according to claim 5, further comprising controlling a temperature used in the heating of the stereolithography resin based on the information.

7. The method according to claim 1 wherein the mixer element further comprises a first magnet and a second magnet arranged so that each magnetic pole of the first magnet faces an opposite pole of the second magnet and having a lamina body extending between the first and second magnets.

8. The method according to claim 1 wherein the data support device is one of a an RFID type device, a magnetic band and an integrated circuit.

9. The method according to claim 1 wherein the connection means comprises at least one of an antenna, a magnetic field and an electrical connector.

\* \* \* \* \*